(12) United States Patent
Buma

(10) Patent No.: US 8,881,875 B2
(45) Date of Patent: Nov. 11, 2014

(54) SUSPENSION APPARATUS FOR VEHICLE

(75) Inventor: Shuuichi Buma, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/387,267

(22) PCT Filed: Sep. 29, 2010

(86) PCT No.: PCT/JP2010/066982
§ 371 (c)(1),
(2), (4) Date: Jan. 26, 2012

(87) PCT Pub. No.: WO2012/042614
PCT Pub. Date: Apr. 5, 2012

(65) Prior Publication Data
US 2012/0186923 A1 Jul. 26, 2012

(51) Int. Cl.
*F16F 9/30* (2006.01)
*F16F 9/06* (2006.01)
*F16F 9/00* (2006.01)

(52) U.S. Cl.
CPC ..................................... *F16F 9/006* (2013.01)
USPC .......................................... 188/268; 188/269

(58) Field of Classification Search
CPC .................................. F16F 9/30; B60G 17/04
USPC .............................. 188/266.1, 268, 269, 266; 267/64.11–64.28; 261/82, 94
See application file for complete search history.

(56) References Cited

U.S. PATENT DOCUMENTS 3,285,596 A * 11/1966 Burgert ....................... 267/64.23
3,424,448 A * 1/1969 Chak Ma ........................ 267/35
4,535,977 A * 8/1985 Strong ........................ 267/64.15
6,052,992 A    4/2000 Eroshenko
6,568,514 B1 * 5/2003 Tokasz .......................... 188/376

(Continued)

FOREIGN PATENT DOCUMENTS

JP    A-10-510351    10/1998
JP    A-2003-521646    7/2003

(Continued)

OTHER PUBLICATIONS

Fadeev et al., "Study of Penetration of Water into Hydrophobized Porous Silicas," *Journal of Colloid and Interface Science*, vol. 187, 275-282, (1997).

(Continued)

*Primary Examiner* — Vishal Sahni
(74) *Attorney, Agent, or Firm* — Oliff PLC

(57) ABSTRACT

A colloidal damper disposed between two members for damping a relative movement of the two members, including: (I) a cylinder device including a housing and a piston which are connected to one and the other of the two members and which define a chamber; (II) a colloidal-solution sealed body accommodated in the chamber and including: (A) a colloidal solution in which are mixed a first working fluid and porous bodies each having pores; and (B) a hermetically sealed container which has flexibility and which hermetically seals the colloidal solution contained therein; and (III) a second working fluid contained in the chamber together with the colloidal-solution sealed body, wherein the colloidal damper is configured to damp the relative movement of the two members by the inflow and the outflow of the first working fluid into and out of the pores upon the relative movement of the two members.

15 Claims, 8 Drawing Sheets

(56) References Cited

U.S. PATENT DOCUMENTS

| | | | |
|---|---|---|---|
| 2003/0010587 A1* | 1/2003 | Eroshenko | 188/314 |
| 2009/0308705 A1 | 12/2009 | Suciu | |
| 2010/0193305 A1* | 8/2010 | Suciu | 188/268 |

FOREIGN PATENT DOCUMENTS

| | | |
|---|---|---|
| JP | A-2004-044732 | 2/2004 |
| JP | A-2005-121091 | 5/2005 |
| JP | A-2005-121092 | 5/2005 |
| JP | A-2006-118571 | 5/2006 |
| JP | A-2008-309250 | 12/2008 |
| JP | A-2010-185577 | 8/2010 |
| WO | WO 96/18040 A1 | 6/1996 |
| WO | WO 2008/029501 A1 | 3/2008 |
| WO | WO 2008/152776 A1 | 12/2008 |

OTHER PUBLICATIONS

Nov. 30, 2010 International Search Report issued in International Patent Application No. PCT/JP2010/066982 (with translation).

* cited by examiner

INTERNAL PRESSURE P

ONE COLLOIDAL-SOLUTION SEALED BODY

TWO COLLOIDAL-SOLUTION SEALED BODIES

STROKE S (b)

INTERNAL PRESSURE P

SECOND COLLOIDAL-SOLUTION SEALED BODY

STROKE RANGE

FIRST COLLOIDAL-SOLUTION SEALED BODY

STROKE S

SUSPENSION APPARATUS FOR VEHICLE

TECHNICAL FIELD

The present invention relates to a colloidal damper which includes a colloidal solution in which a fluid and porous bodies each having pores are mixed and which is capable of dissipating an energy applied thereto from an exterior, utilizing an action by an inflow and an outflow of the fluid into and out of the pores of each porous body.

BACKGROUND ART

A colloidal damper described in each of the following Patent Literatures uses a colloidal solution in which are mixed a fluid and porous bodies such as hydrophobized porous silica gel. In the colloidal solution, the fluid repeatedly flows in and flows out of the pores of each porous body under an action of surface tension, whereby an energy applied from an exterior is dissipated. The colloidal damper has characteristics that conventional hydraulic dampers do not have. For instance, in the colloidal damper, the energy dissipation amount is equal to an amount that depends on an amplitude of a vibration. Thus, it is expected that the colloidal damper will be applied to various fields.

CITATION LIST

Patent Literature

Patent Literature 1: WO 20081029501
Patent Literature 2: JP-A-2008-309250

SUMMARY OF INVENTION

Technical Problem

The colloidal dampers described in the above Patent Literatures are still under development, and there is plenty of room for improvement. Accordingly, the utility of the colloidal damper can be enhanced by various modifications. The present invention has been developed in the light of the situations described above, and it is therefore an object of the invention to provide a colloidal damper with high utility.

Solution to Problem

To solve the problem indicated above, the present invention provides a colloidal damper, comprising: (I) a cylinder device including a housing connected to one of two members which move relative to each other and a piston connected to the other of the two members which move relative to each other and configured to be slidable in the housing; (II) a colloidal-solution sealed body which is accommodated in a chamber defined by the housing and the piston and which includes: (A) a colloidal solution in which are mixed a first working fluid and porous bodies each having a multiplicity of pores; and (B) a hermetically sealed container which has flexibility and which hermetically seals the colloidal solution contained therein, the colloidal-solution sealed body being configured such that a volume thereof decreases by an inflow of the first working fluid into the pores of each of the porous bodies where a pressure applied to the colloidal-solution sealed body increases and such that the volume thereof increases by an outflow of the first working fluid out of the pores of each of the porous bodies where the pressure applied to the colloidal-solution sealed body decreases; and (III) a second working fluid contained in the chamber together with the colloidal-solution sealed body, wherein the colloidal damper is configured to damp the relative movement of the two members which move relative to each other by the inflow and the outflow of the first working fluid into and out of the pores of each of the porous bodies upon the relative movement of the two members.

Advantageous Effects of Invention

In the colloidal damper according to the present invention, the colloidal solution is hermetically contained in the container, whereby it is possible to prevent the porous bodies from being rubbed with the housing and the piston of the cylinder device. Accordingly, the present colloidal damper is excellent in durability, ensuring high utility.

Forms of Invention

There will be explained various forms of an invention which is considered claimable (hereinafter referred to as "claimable invention" where appropriate). Each of the forms of the invention is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following descriptions of various forms and embodiments. It is to be further understood that any form in which one or more elements is/are added to or deleted from any one of the following forms may be considered as one form of the claimable invention.

The following form (1) is not the claimable invention, but is a form that indicates a structure as a basis of the claimable invention. Each of forms which follows the form (1) and which depends on the form (1) corresponds to the claimable invention. Among the claimable inventions in various forms, a combination of the forms (1), (11), and (12), which corresponds to the form (31), corresponds to claim 1. A form in which the matter to define the invention of the form (13) is added to claim 1 corresponds to claim 2. A form in which the matters to define the invention of the forms (2) and (20) are added to claim 2 corresponds to claim 3. A form in which the matter to define the invention of the form (14) is added to any one of claims 1-3 corresponds to claim 4. A form in which the matter to define the invention of the form (15) is added to claim 4 corresponds to claim 5. A form in which the matter to define the invention of the form (16) is added to any one of claims 1-5 corresponds to claim 6. A form in which the matter to define the invention of the form (17) is added to claim 6 corresponds to claim 7. A form in which the matter to define the invention of the form (18) is added to any one of claims 1-7 corresponds to claim 8. A form in which the matter to define the invention of the form (19) is added to claim 8 corresponds to claim 9. A form in which the matter to define the invention of the form (21) is added to any one of claims 1-9 corresponds to claim 10. A form in which the matters to define the invention of the forms (22) and (23) are added to claim 10 corresponds to claim 11. A form in which the matter to define the invention of the form (25) is added to any one of claims 1-11 corresponds to claim 12. A form in which the matter to define the invention of the form (27) is added to any one of claims 1-12 corresponds to claim 13. A form in which the matter to define the invention of the form (4) is added to any one of claims 1-13 corresponds to claim 14. A form in which the matters to define the invention of the forms (25) and (26) are added to claim 14 corresponds to claim 15.

(1) A colloidal damper disposed between two members which move relative to each other, for damping a relative movement of the two members, comprising:

a cylinder device including a housing connected to one of the two members and a piston connected to the other of the two members and configured to be slidable in the housing, the housing and the piston defining a chamber; and a colloidal solution in which are mixed a working fluid and porous bodies each having a multiplicity of pores and which is accommodated in the chamber, wherein the colloidal damper is configured to damp the relative movement of the two members by an inflow and an outflow of the working fluid into and out of the pores of each of the porous bodies upon the relative movement of the two members.

As explained above, this form indicates a structure as a basis of the claimable invention. That is, there are listed, in this form, basic constituent elements of the colloidal damper of the claimable invention. The claimable invention is widely applicable to the conventionally developed colloidal dampers.

Concerning the "colloidal solution" described in this form, the kinds of each porous body and the working fluid that constitute the colloidal solution are not particularly limited, but it is preferable that the porous body and the working fluid have low affinity relative to each other and that the porous body and the working fluid be hard to be coupled to each other. In short, it is preferable that the porous body be less likely to be dissolved in the working fluid. As the "porous body", there may be employed a particle in the order of micro meter (µm), i.e., a micro particle, having pores in the order of nanometer (nm). For instance, there may be employed a particle which has lyophobicity (hydrophobicity) and which is hard to be dissolved in the working fluid, a particle coated with a lyophobic substance, or the like. More specifically, there may be employed, as the porous body, silica gel, aero gel, ceramics, zeolite, porous glass, porous polystyrene, or the like. As the "working fluid", there may be employed water, a mixed fluid of water and an antifreeze agent (such as ethanol, ethylene glycol, propylene glycol, glycerin), mercury, molten metal, or the like. It is noted that water has relatively large surface tension. Accordingly, where water is employed as the working fluid, there is attained a colloidal damper which generates a large force owing to the large surface tension when the water flows in and flows out of the pores of each porous body. Where water is used as the working fluid, it is preferable to use the porous body having low hydrophilicity or the porous body that has been subjected to a hydrophobization treatment.

Take, for example, a colloidal damper in which the colloidal solution is contained in the chamber. In, the colloidal damper, when a force to decrease the volume of the chamber is applied to the housing and the piston, the fluid pressure of the working fluid in the colloidal solution is increased. When the fluid pressure of the working fluid reaches a certain level, the working fluid flows into the pores of each porous body against the surface tension of the working fluid. The inflow of the working fluid into the pores permits a relative movement of the housing and the piston so as to decrease the volume of the chamber. On the other hand, when the housing and the piston are released from the force applied thereto, the fluid pressure of the working fluid is reduced. When the fluid pressure of the working fluid is reduced, the working fluid flows out of the pores of each porous body. The outflow of the working fluid from the pores permits a relative movement of the housing and the piston so as to increase the volume of the chamber.

As mentioned above, in the colloidal damper, the relative position of the housing and the piston and the inflow amount of the working fluid into the porous bodies relate to each other. Further, the pressure in the chamber changes in accordance with the inflow amount of the working fluid into the porous bodies. In other words, the relative position of the housing and the piston and the pressure in the chamber relate to each other. Where the state between each porous body and the working fluid is explained with reference to a contact angle therebetween, the contact angle becomes large when the working fluid flows into the porous body while the contact angle becomes small when the working fluid flows out of the porous body. Accordingly, there is generated a difference between the pressure in the chamber when the working fluid flows into the pores of the porous bodies (when the cylinder device contracts) and the pressure in the chamber when the working fluid flows out of the pores of the porous bodies (when the cylinder device extends). That is, there is generated hysteresis in a change of the pressure in the chamber with respect to a change of the relative position of the housing and the piston, whereby the colloidal damper is configured to damp the relative movement of the two members which move relative to each other by dissipating a kinetic energy of the two members which move relative to each other.

(2) The colloidal damper according to the form (1), wherein the working fluid is water.

(3) The colloidal damper according to the form (2), wherein the porous bodies are hydrophobized porous silica gel.

In the above two forms, the composition of the colloidal solution is limited. As mentioned above, because water has large surface tension, water is suitable for the working fluid of the colloidal damper. Where the working fluid is water, it is preferable that each porous body have hydrophobicity. The latter form is the preferable form.

(4) The colloidal damper according to any one of the forms (1)-(3), wherein the two members are a body of a vehicle and a wheel holding member which rotatably holds a wheel, wherein the housing is connected to one of the body of the vehicle and the wheel holding member while the piston is connected to the other of the body of the vehicle and the wheel holding member, and wherein the colloidal damper is configured to constitute a suspension apparatus for the vehicle to suspend the body of the vehicle.

In this form, the colloidal damper is formed as one constituent element of a suspension apparatus for a vehicle. More specifically, in this form, the colloidal damper at least serves as a shock absorber configured to damp the relative movement of the vehicle body and the wheel holding member.

(5) The colloidal damper according to the form (4), being configured to support the body of the vehicle by a pressure in the chamber in a state in which the working fluid has flowed into the porous bodies.

(6) The colloidal damper according to the form (5), being configured to bear all of a shared load of a wheel that corresponds to itself by the pressure in the chamber in the state in which the working fluid has flowed into the porous bodies.

In the above two forms, the colloidal damper bears at least a part of a shared load of a wheel (so-called "1W") that corresponds to itself. That is, in the above two forms, the colloidal damper is used not only as the shock absorber, but also as a spring. In the latter form, the colloidal damper is capable of bearing the entirety of 1W. According to the latter form, it is not necessary to additionally provide a suspension spring, attaining a compact suspension apparatus.

(7) The colloidal damper according to the form (5) or (6), being configured such that the pressure in the chamber becomes equal to a degree which is proportional to an amount of the working fluid that has flowed into the porous bodies, in a range in which the vehicle body and the wheel holding member move relative to each other.

It has been revealed from conventional researches and experiments that there exists a range in which the pressure in the chamber and the inflow amount of the working fluid into the porous bodies have a substantially linear relationship, as a characteristic of ordinary colloidal dampers. This form may be arranged such that a stroke range of the cylinder device or a range of the relative movement of the two members that move relative to each other falls within the range in which the pressure in the chamber and the inflow amount of the working fluid have the linear relationship. This form enables the colloidal damper to generate, all the time, a force for supporting the weight of the vehicle, in other words, this form enables the colloidal damper to function, all the time, as the suspension spring.

The above form wherein the stroke range of the cylinder device falls within the range in which the pressure in the chamber and the inflow amount of the working fluid have the linear relationship may be arranged as follows, for instance. The inflow amount of the working fluid into the porous bodies is substantially equal to a reduction amount of the volume of the chamber, in the colloidal damper configured such that the colloidal solution is contained in the chamber, for instance. In a form (which will be explained later) wherein the cylinder device has a construction similar to a hydraulic damper, the volume of a portion of the piston rod that has advanced into the housing is substantially equal to the inflow amount of the working fluid into the porous bodies. In view of the above, initially, the amount of the porous bodies is determined to be equal to an amount that enables an inflow of the working fluid by an amount which is the same as the volume reduction amount of the chamber (or the volume of the portion of the piston rod that has advanced into the housing) at a time when the cylinder device carries out stroke movement from a full rebound position to a full bound position. Next, the amount of the working fluid is determined so as to be larger than the amount to flow into the porous bodies (that is equal to the volume reduction amount of the chamber). The colloidal damper in this form may be constituted by including the colloidal solution in which the working fluid and the porous bodies are mixed in the respective amounts determined as described above.

(11) The colloidal damper according to any one of the forms (1)-(7), comprising a colloidal-solution sealed body which is accommodated in the chamber and which includes: the colloidal solution; and a hermetically sealed container which has flexibility and which hermetically seals the colloidal solution contained therein, the colloidal-solution sealed body being configured such that a volume thereof decreases by the inflow of the working fluid into the pores of each of the porous bodies where a pressure applied to the colloidal-solution sealed body increases and such that the volume thereof increases by the outflow of the working fluid from the pores of each of the porous bodies where the pressure applied to the colloidal-solution sealed body decreases.

In a colloidal damper in which the colloidal solution is contained in the chamber, for instance, the inside of the cylinder may suffer from wear due to the porous bodies. In particular, the wear of seal members of the piston or a portion of the housing on which the piston slides causes a serious problem since such wear leads to leakage of the colloidal solution. To deal with this, there exists a colloidal damper in which the porous bodies are separated or isolated, using a filter or a container, from a portion of the housing on which the piston slides. However, the porous bodies may become smaller after having been crushed by a stress or the like. That is, in the colloidal damper in which the porous bodies are separated or isolated by the filter or the container, since the filter or the container permits transmission of the working fluid therethrough, the porous bodies which has become smaller by crushing may clog in the filter or the container or may transmit therethrough.

In contrast with the colloidal damper described above, the colloidal damper in this form is configured such that the colloidal solution is hermetically contained in the hermetically sealed container, whereby the porous bodies and the working fluid do not flow outside the hermetically sealed container. That is, according to this form, the porous bodies do not rub against the housing and the piston, making it possible to prevent wear of the inside of the cylinder device. Further, as mentioned above, even if the porous bodies are crushed and become smaller, the porous bodies do not flow outside the hermetically sealed container. Accordingly, this form achieves a colloidal damper having excellent durability. The colloidal damper according to this form may be configured to permit the volume change of the chamber of the cylinder device, namely, to permit the stroke of the cylinder device, by a change of the volume of the colloidal-solution sealed body which results from the inflow and the outflow of the working fluid with respect to the porous bodies upon the relative movement of the housing and the piston.

The "hermetically sealed container" in this form is configured to permit the change of the volume of the colloidal solution which is caused by the inflow and the outflow of the working fluid with respect to the porous bodies while keeping the hermetically sealed state of the colloidal solution. The hermetically sealed container may or may not generate a restoring force with respect to deformation thereof. For instance, there may be employed various kinds of hermetically sealed container such as those having a bag-like configuration, having expansion and contraction property, or having elasticity. In this form, the colloidal-solution sealed body may be configured to be interposed between the housing and the piston such that a force is transmitted directly to the colloidal-solution sealed body. Alternatively, as explained later, the colloidal-solution sealed body may be configured such that the force is transmitted thereto via a fluid filled in the chamber.

The hermetically sealed container is not limited to one that forms, by itself, a space for hermetically sealing the colloidal solution, but may be one that cooperates with the housing to form the space for hermetically sealing the colloidal solution. For instance, one end of a flexible member may be fixed to a wall of the inside of the housing, so as to define the hermetically sealed container. That is, the colloidal damper according to this form may be considered as including a hermetically-sealed-space defining member which has flexibility and which defines the hermetic space in the chamber by itself or by cooperation with the housing, for hermetically sealing the colloidal solution contained in the hermetic space.

(12) The colloidal damper according to the form (11), wherein, where the working fluid is an inside working fluid, the colloidal damper comprises, apart from the inside working fluid, an outside working fluid which is present outside the hermetically sealed container and which is contained in the chamber together with the colloidal-solution sealed body.

In this form, a force applied to the cylinder device is transmitted to the colloidal-solution sealed body via the outside working fluid. The "outside working fluid" in this form may be the same as or different from, in property, the inside working fluid as the working fluid in the colloidal-solution sealed body. In terms of easiness of transmission, to the colloidal-solution sealed body, of the force applied to the cylinder device, it is preferable to employ, as the "outside working fluid" in this form, the fluid having high viscosity.

(13) The colloidal damper according to the form (12), wherein the inside working fluid and the outside working fluid are mutually different in property.

As mentioned above, it is preferable that the inside working fluid have large surface tension while it is preferable that the outside working fluid can efficiently transmit, to the colloidal-solution sealed body, the force applied to the cylinder device. According to this form, suitable fluids can be employed as the inside working fluid and the outside working fluid, respectively, so as to meet such demands. In this form, the inside working fluid and the outside working fluid may be different in kind, such as water and oil. Alternatively, the inside working fluid and the outside working fluid may be the same in kind and different in characteristic and property, such as a high-viscous oil and a low-viscous oil.

(14) The colloidal damper according to the form (12) or (13), wherein the inside working fluid and the outside working fluid are mutually different in viscosity.

(15) The colloidal damper according to the form (14), wherein the outside working fluid has a viscosity higher than that of the inside working fluid.

In the above two forms, the two working fluids are mutually different in viscosity. The "viscosity" is a concept including not only viscosity (also referred to as absolute viscosity, viscosity index or viscosity coefficient) which is a magnitude of internal resistance of the fluid per unit area that acts with respect to an external force (a shearing force), in a direction perpendicular to the direction of the external force, but also dynamic viscosity which is a speed at which the fluid flows in capillaries in the gravity direction (obtained by dividing the absolute viscosity by density).

As described above, the outside working fluid preferably has high viscosity in terms of transmission easiness of the force applied to the cylinder device. The latter form is the preferable form. Where the colloidal damper constitutes the suspension apparatus and bears the vehicle body weight, for instance, it is necessary to ensure hermeticity of seals provided in the housing for keeping the inside of the chamber of the cylinder device at a high pressure. The high-viscous fluid is unlikely to leak through the seals. Accordingly, the latter form in which the high-viscous fluid is employed as the outside working fluid is particularly effective in the colloidal damper in which the inside of the chamber needs to be kept at a high pressure as described above. In general, the high-viscous fluid has good lubricity, enabling the piston to smoothly slide in the housing.

(16) The colloidal damper according to any one of the forms (12)-(15), wherein the inside working fluid (88, 94) and the outside working fluid are mutually different in heat conduction property.

(17) The colloidal damper according to the form (16), wherein the outside working fluid has heat conductivity lower than that of the inside working fluid.

In the above two forms, the two working fluids are mutually different in temperature transfer degree (i.e., heat transfer degree). In the latter form, in short, the outside working fluid is a fluid that is unlikely to transfer temperature. In the colloidal damper having the outside working fluid, the colloidal-solution sealed body may be covered with the outside working fluid. According to the latter form, the temperature of the exterior of the cylinder device is unlikely to transfer to the inside working fluid, namely, the temperature of the inside working fluid is unlikely to escape to the exterior of the cylinder device. Where the inside working fluid is a fluid whose property changes depending upon the temperature, for instance, it is possible to suppress transfer of the temperature to the inside working fluid owing to the outside working fluid having low heat conductivity, so as to suppress the temperature change of the inside working fluid.

(18) The colloidal damper according to any one of the forms (12)-(17), wherein the inside working fluid and the outside working fluid are mutually different in coagulation temperature.

(19) The colloidal damper according to the form (18), wherein the outside working fluid has a coagulation temperature lower than that of the inside working fluid.

In the above two forms, the two working fluids are mutually different in coagulation temperature (i.e., freezing temperature or solidification temperature). In the latter form, in short, the outside working fluid is a fluid that is unlikely to coagulate. When the outside working fluid starts to coagulate, for instance, there may be a risk that the force to be transmitted to the colloidal-solution sealed body changes relative to the force applied to the cylinder device. According to the latter form, however, it is possible to transmit, with high reliability, the force applied to the cylinder device to the colloidal-solution sealed body owing to the outside working fluid which is less likely to coagulate.

Where there is a risk that the inside working fluid coagulates due to a decrease in the outside air temperature, e.g., where water is employed as the inside working fluid, the latter form is preferably combined with the above-indicated form in which the heat conductivity of the outside working fluid is lower than that of the inside working fluid. In such an arrangement, the colloidal-solution sealed body is covered with the outside working fluid, whereby the temperature of the inside working fluid is unlikely to escape to the exterior owing to the outside working fluid having low heat conductivity. Accordingly, it is possible to prevent the inside working fluid from coagulating or solidifying.

(20) The colloidal damper according to any one of the forms (12)-(19), wherein the outside working fluid is oil.

In this form, the outside working fluid is limited. For instance, as the outside working fluid, there may be employed a mineral oil, a synthetic oil such as a silicone oil, or the like. Take, for instance, a colloidal damper constructed according to a combination of this form and the above-indicated form in which water is employed as the inside working fluid. In general, the viscosity of oil is higher than that of water. Accordingly, the thus constructed colloidal damper may be considered as one arrangement of the above-indicated form in which the viscosity of the outside working fluid is higher than that of the inside working fluid. Further, since the heat conductivity of oil is lower than that of water, the thus constructed colloidal damper may be considered as one arrangement of the above-indicated form in which the heat conductivity of the outside working fluid is lower than that of the inside working fluid. Moreover, since the coagulation temperature of oil is lower than that of water, the thus constructed colloidal damper may be considered as one arrangement of the above-indicated form in which the coagulation temperature of the outside working fluid is lower than that of the inside working fluid. Thus, the colloidal damper which uses water as the inside working fluid and oil as the outside working fluid ensures various advantages mentioned above and is excellent in various aspects.

(21) The colloidal damper according to any one of the forms (11)-(20), wherein the cylinder device is configured such that an inside of the housing is partitioned into two chambers by the piston, and wherein one of the two chambers accommodates the colloidal-solution sealed body.

(22) The colloidal damper according to the form (21), wherein the piston includes: a piston body which partitions the inside of the housing into the two chambers such that the piston body is interposed therebetween; and a piston rod which is connected, at one end portion thereof, to the piston body and which is connected, at the other end portion thereof that extends from the housing, to the other of the two members.

In the above two forms, the structure of the cylinder device is limited.

(23) The colloidal damper according to the form (22), wherein the piston rod extends from the housing such that the piston rod penetrates the other of the two chambers in which the colloidal-solution sealed body is not accommodated, so as to be connected to the other of the two members.

In this form, the colloidal-solution sealed body is accommodated in the one of the two chambers whose volume decreases when the two members which move relative to each other approach each other and whose volume increases when the two members move away from each other. In this form, the colloidal-solution sealed body is not accommodated in the other of the two chambers in which the piston rod is accommodated, making it possible not to hinder the sliding movement of the piston in the housing.

(24) The colloidal damper according to any one of the forms (21)-(23), wherein, where the working fluid is an inside working fluid, the colloidal damper comprises, apart from the inside working fluid, an outside working fluid which is present outside the hermetically sealed container and which is contained in the chamber together with the colloidal-solution sealed body, and wherein the cylinder device has a communication passage which brings the two chambers into communication with each other for permitting the outside working fluid to flow between the two chambers in association with a sliding movement of the piston.

In this form, it is possible to generate a damping force by imparting a resistance force to the outside working fluid that flows through the communication passage. In such an arrangement, in addition to damping by the inflow and the outflow of the inside working fluid into and out of the porous bodies, the damping force by ordinary hydraulic dampers can also be generated. By combining the two damping forces, the relative movement of the two members that move relative to each other can be effectively damped.

(25) The colloidal damper according to any one of the forms (11)-(24), wherein the colloidal-solution sealed body is fixed to one end of the chamber remote from the piston.

In this form, the position at which the colloidal-solution sealed body is disposed is limited. According to this form, the colloidal-solution sealed body does not contact the piston at all, thereby preventing, with high reliability, the colloidal-solution sealed body from hindering the sliding movement of the piston in the housing.

(26) The colloidal damper according to the form (25), wherein the two members are a body of a vehicle and a wheel holding member which rotatably holds a wheel, wherein the housing is connected to the body of the vehicle and the piston is connected to the wheel holding member, and wherein the colloidal damper is configured to constitute a suspension apparatus for the vehicle to suspend the body of the vehicle.

In this form, the colloidal-solution sealed body is disposed on the side of the vehicle body in an arrangement in which the colloidal damper constitutes the suspension apparatus. Where the colloidal-solution sealed body is disposed on the side of the wheel, for instance, a high-frequency unsprung vibration is inputted directly to the colloidal-solution sealed body. In this form, the high-frequency unsprung vibration is restrained from being inputted to the colloidal-solution sealed body, as compared with a case in which the colloidal-solution sealed body is disposed on the wheel side, thereby suppressing wear of the inside of the hermetically sealed container which would be otherwise caused by the porous bodies moved in the hermetically sealed container. Further, in this form, the weight of the housing which accommodates the colloidal-solution sealed body and the outside working fluid is relatively large. However, the housing is connected to the vehicle body, whereby the weight of the unsprung portion can be made small, so as not to deteriorate ride comfort of the vehicle.

(27) The colloidal damper according to any one of the forms (11)-(26), wherein, where the colloidal-solution sealed body is a first colloidal-solution sealed body, the colloidal damper comprises another colloidal-solution sealed body as a second colloidal-solution sealed body, the first colloidal-solution sealed body and the second colloidal-solution sealed body being accommodated in the chamber, and wherein, where the colloidal solution of the first colloidal-solution sealed body is a first colloidal solution, the second colloidal-solution sealed body includes a second colloidal solution different from the first colloidal solution in composition.

The colloidal damper according to this form has two colloidal-solution sealed bodies including respective colloidal solutions which are mutually different in composition. In the colloidal damper according to this form, the characteristic of the colloidal damper can be made appropriate by combining the characteristics of the colloidal solutions of the respective two colloidal-solution sealed bodies.

In this form, as there are some differences in composition between the two colloidal solutions, the characteristic of the colloidal damper can be made appropriate utilizing differences in property and characteristic between the two colloidal solutions. "The first colloidal solution and the second colloidal solution differ in composition." described in this form means that the first colloidal solution and the second colloidal solution are not identical, as follows. For instance, the porous bodies and/or the working fluid of the first colloidal solution may not be identical with the porous bodies and/or the working fluid of the second colloidal solution. The amounts of the porous bodies of the respective two colloidal solutions may differ from each other. The degree of the lyophobization treatment of the porous bodies (such as the average pore diameter or the overall length of the pores) in the first colloidal solution may differ from that in the second colloidal solution. The property of the working fluid (such as the above-indicated viscosity, heat conduction property, or coagulation temperature) in the first colloidal solution may differ from that in the second colloidal solution.

More specifically, in an arrangement in which the coagulation temperatures of the working fluids of the respective two colloidal-solution sealed bodies are made different from each other, for instance, even if the working fluid of one of the two colloidal-solution sealed bodies coagulates, the working fluid of the other of the two colloidal-solution sealed bodies does not coagulate. Accordingly, it is possible to avoid a situation in which the colloidal damper does not operate at all. Further, in an arrangement in which the degrees of the lyophobization treatment of the porous bodies of the respective two colloidal-solution sealed bodies are made different from each other, it is possible to adjust a relationship between the stroke of the cylinder device and the pressure in the chamber, whereby the function as the shock absorber and the function as the spring described above can be made appropriate.

In the above-indicated form in which the housing is partitioned into the two chambers, this form may be configured such that both of the two colloidal-solution sealed bodies may be accommodated in one of the two chambers. Alternatively, one of the two colloidal-solution sealed bodies may be accommodated in one of the two chambers while the other of the two colloidal-solution sealed bodies may be accommodated in the other of the two chambers.

(31) A colloidal damper disposed between two members which move relative to each other, for damping a relative movement of the two members, comprising:

a cylinder device including a housing connected to one of the two members and a piston connected to the other of the two members and configured to be slidable in the housing, the housing and the piston defining a chamber, a colloidal-solution sealed body which is accommodated in the chamber and which includes: (A) a colloidal solution in which are mixed a first working fluid and porous bodies each having a multiplicity of pores; and (B) a hermetically sealed container which has flexibility and which hermetically seals the colloidal solution contained therein, the colloidal-solution sealed body being configured such that a volume thereof decreases by an inflow of the first working fluid into the pores of each of the porous bodies where a pressure applied to the colloidal-solution sealed body increases and such that the volume thereof increases by an outflow of the first working fluid out of the pores of each of the porous bodies where the pressure applied to the colloidal-solution sealed body decreases, and a second working fluid contained in the chamber together with the colloidal-solution sealed body, wherein the colloidal damper is configured to damp the relative movement of the two members by the inflow and the outflow, of the first working fluid into and out of the pores of each of the porous bodies upon the relative movement of the two members.

This form is a combination of the above-indicated form in which the colloidal damper is equipped with the colloidal-solution sealed body and the above-indicated form in which the colloidal damper is equipped with the outside working fluid. The "first working fluid" described in this form corresponds to the "inside working fluid" while the "second working fluid" described in this form corresponds to the "outside working fluid".

BRIEF DESCRIPTION OF DRAWINGS

FIG. 7 is a graph showing a relationship between a stroke of a cylinder device and an internal pressure of the cylinder device in a colloidal damper according to a modified example of the claimable invention.

DESCRIPTION OF EMBODIMENTS

There will be described in detail representative embodiments of the claimable invention as one embodiment and modified embodiments, with reference to the drawings. It is to be understood that the claimable invention may be embodied with various changes and modifications based on knowledge of those skilled in the art, in addition to the following embodiments and various forms described in the FORMS OF INVENTION.

EMBODIMENTS

<Structure of Suspension Apparatus>

Figure 1:
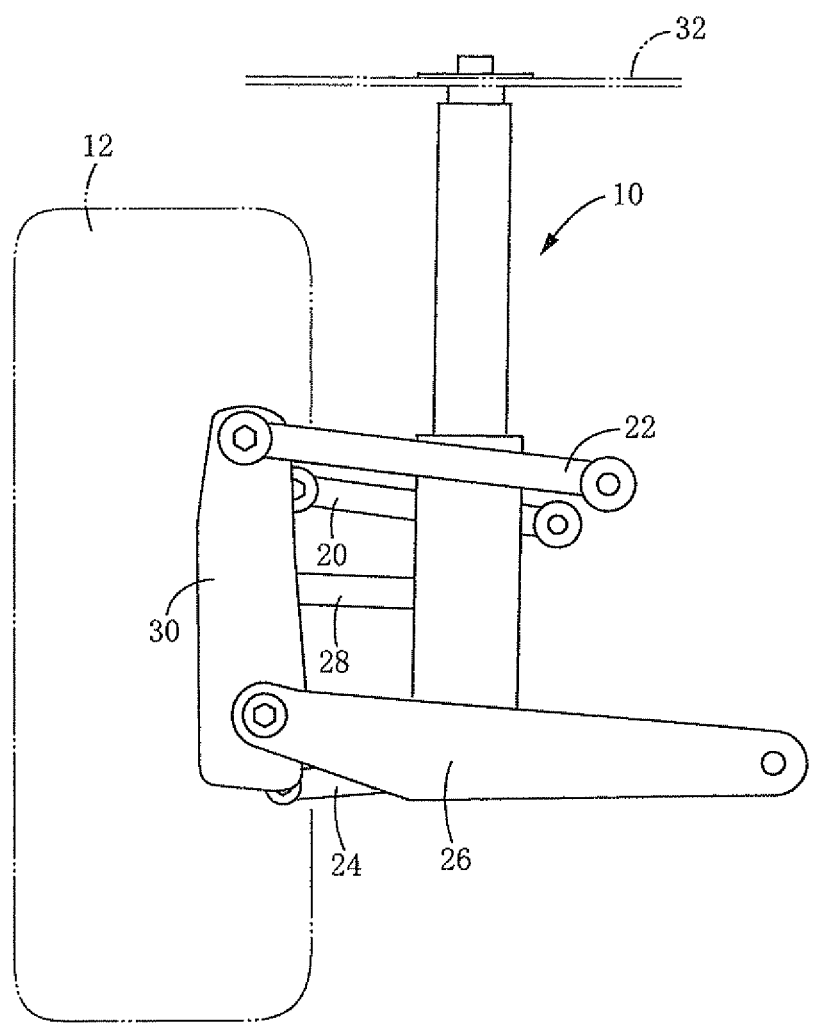
FIG. 1 is a front elevational view of a suspension apparatus for a vehicle which includes, as one constituent element, a colloidal damper according to one embodiment of the claimable invention.

As shown in FIG. 1, a colloidal damper 10 according to the present embodiment is one constituent element of a suspension apparatus for a vehicle. The suspension apparatus for the vehicle is of an independent suspension type corresponding to each of wheels 12 of the vehicle and is formed as a multi-link suspension apparatus. The suspension apparatus includes, each as a suspension arm, a first upper arm 20, a second upper arm 22, a first lower arm 24, a second lower arm 26, and a toe control arm 28. One end of each of the five arms 20, 22, 24, 26, 28 is pivotably connected to a body of the vehicle while the other end is pivotably connected to an axle carrier 30 as a wheel holding member for rotatably holding the wheel 12. Owing to the five arms 20, 22, 24, 26, 28, the axle carrier 30 is permitted to move upward and downward along a constant locus with respect to the vehicle body. The present colloidal damper 10 is disposed between the second lower arm 26 and a mount portion 32, as a part of the vehicle body, provided at a tire housing.

Figure 2:
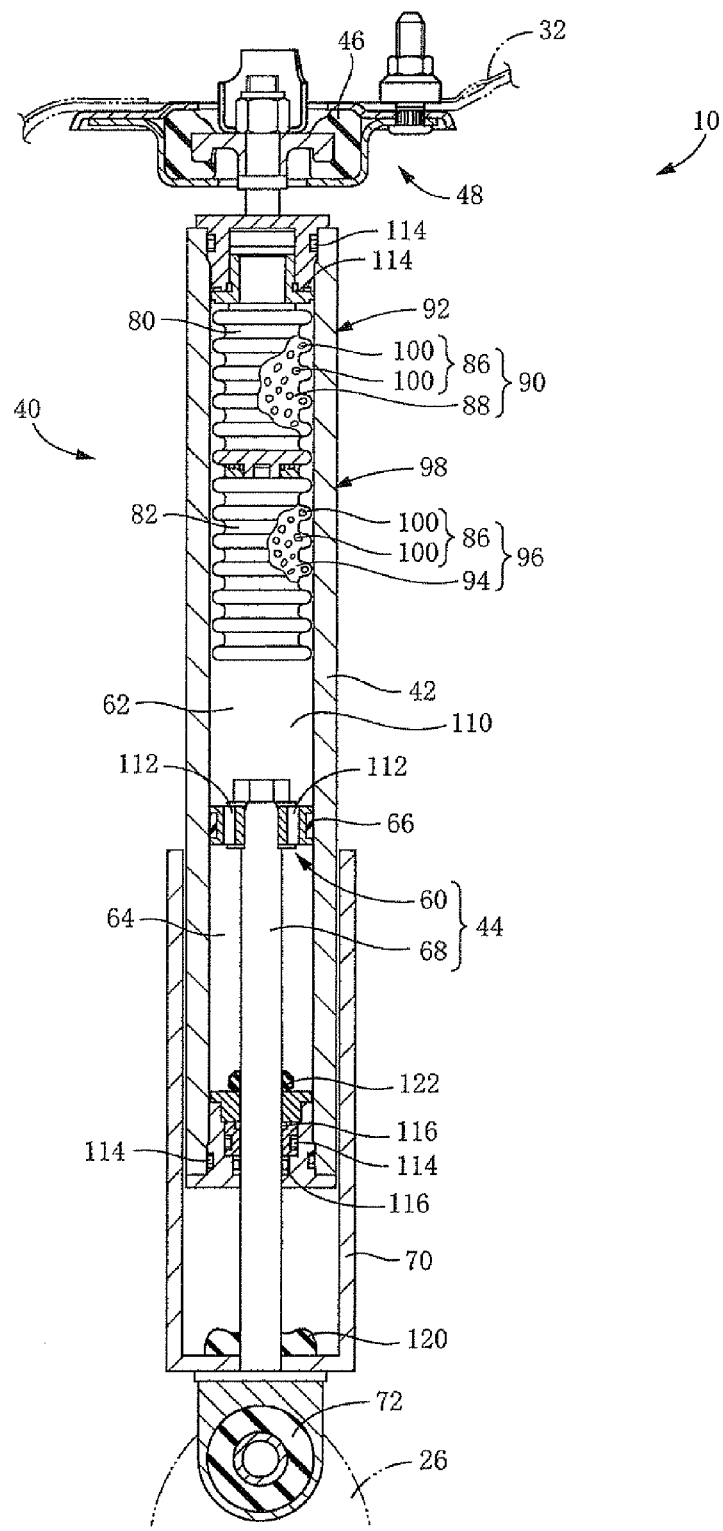
FIG. 2 is a front cross-sectional view of the colloidal damper according to the embodiment of the claimable invention.

FIG. 2 is a front cross-sectional view of the colloidal damper 10. The colloidal damper 10 includes a cylinder device 40 as a main component. The cylinder device 40 is disposed between the mount portion 32 and the second lower arm 26. The cylinder device 40 includes a generally cylindrical housing 42 and a piston 44 which is disposed so as to be slidable relative to the housing 42. The housing 42 is connected at an upper end portion thereof to an underside of the mount portion 32 via an upper support 48 which includes a vibration damping rubber 46.

The piston 44 includes a piston body 60 which partitions the inside of the housing 42 into the two chambers, i.e., an upper chamber 62 and a lower chamber 64, such that the piston body 60 is interposed therebetween. A Teflon-coated band 66 is wound around the outer circumference of the piston body 60, whereby the piston body 60 is smoothly slidable relative to the housing 42. The piston 44 further includes a piston rod 68 which is connected at an upper end portion thereof to the piston body 60 and which extends from a lid portion provided at a lower end portion of the housing 42.

The cylinder device 40 includes a cover tube 70 in which the piston rod 68 and a lower part of the housing 42 are accommodated. To an inner bottom portion of the cover tube 70, a lower end portion of the piston rod 68 is fixed. The cover tube 70 is connected at a lower end thereof to the second lower arm 26 via a bushing 72.

To a lid portion which is provided at the upper end portion of the housing 42, two rubber bellows 80, 82 are fixed so as to be connected in series and are accommodated in the upper chamber 62. In one 80 of the two bellows 80, 82, a first colloidal solution 90 in which are mixed hydrophobized porous silica gel 86 and water 88 is contained and is hermetically sealed. That is, the first colloidal solution 90 and the bellow 80 which functions as a hermetically sealed container constitute a first colloidal-solution sealed body 92. In the other 82 of the two bellows 80, 82, a second colloidal solution 96 in which are mixed the hydrophobized porous silica gel 86 and a mixed liquid 94 comprising water and an antifreeze agent is contained and is hermetically sealed. That is, the second colloidal solution 96 and the bellow 82 which functions as the hermetically sealed container constitute a second colloidal-solution sealed body 98. Accordingly, the present colloidal damper 10 includes the two colloidal-solution sealed bodies 92, 98.

Figure 3:
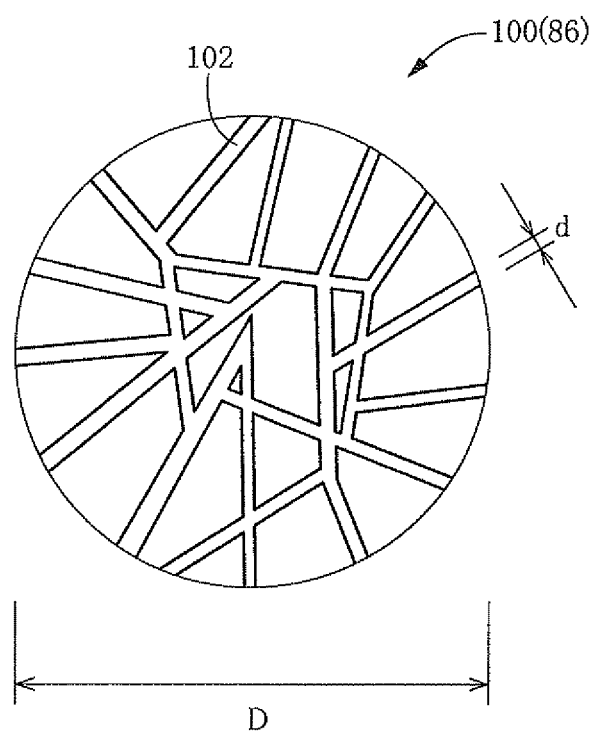
FIG. 3 is a cross-sectional view schematically showing a porous body of a colloidal solution shown in FIG. 2.

FIG. 3 schematically shows a cross section of one particle 100 of the hydrophobized porous silica gel 86. The hydrophobized porous silica gel particle 100 is obtained by performing a hydrophobization treatment using a hydrophobic substance on a spherical silica gel particle having an outside diameter D in the order of from several μm to several tens of μm and having pores 102 each of which has an inside diameter d in the order of from several nm to several tens of nm. The hydrophobization treatment is performed on the surface (including the inside of each pore 102) of the spherical silica gel particle. In other words, each of the hydrophobized porous silica gel particles 100 functions as a porous body.

A mineral oil 110, as an outside working fluid, is contained in the upper chamber 62 in which the two colloidal-solution sealed bodies 92, 98 are accommodated. The mineral oil 110 is contained also in the lower chamber 64. A plurality of communication passages 112 are formed in the piston body 60 so as to penetrate the piston body 60 in the axial direction for permitting communication between the upper chamber 62 and the lower chamber 64. That is, when the volumes of the upper chamber 62 and the lower chamber 64 change in association with the sliding movement of the piston 44 with respect to the housing 42, the mineral oil 110 is permitted to flow between the upper chamber 62 and the lower chamber 64 through the communication passages 112. As explained in detail later, since the pressure in the housing 42 becomes high, a plurality of high-pressure seals 114, 116 are provided at the lid portions of the respective upper and lower portions of the housing 42 for preventing leakage of the mineral oil 100. In particular, at the lid portion of the lower end portion on which the piston rod 68 slides, two seals 116 are provided so as to be in contact with the sliding surface of the piston rod 68. Grease is hermetically sealed between the two seals 116, thereby enhancing sealing.

The colloidal damper 10 includes a mechanism for limiting movements of the vehicle body and the wheel toward and away from each other, i.e., the so-called bound stopper and rebound stopper. More specifically, the bound stopper includes an annular buffer rubber 120 attached to the inner bottom portion of the cover tube 70 and is configured such that the lower end portion of the housing 42 comes into abutting contact with the cover tube 70 via the buffer rubber 120. The rebound stopper includes an annular buffer rubber 122 attached to the upper surface of the lid portion of the lower end portion of the housing 42 and is configured such that the lower surface of the piston body 60 comes into abutting contact with the lid portion of the lower end portion of the housing 42 via the buffer rubber 122.

<Characteristic of Colloidal Damper> i) Characteristic of Ordinary Colloidal Damper

Figure 4:
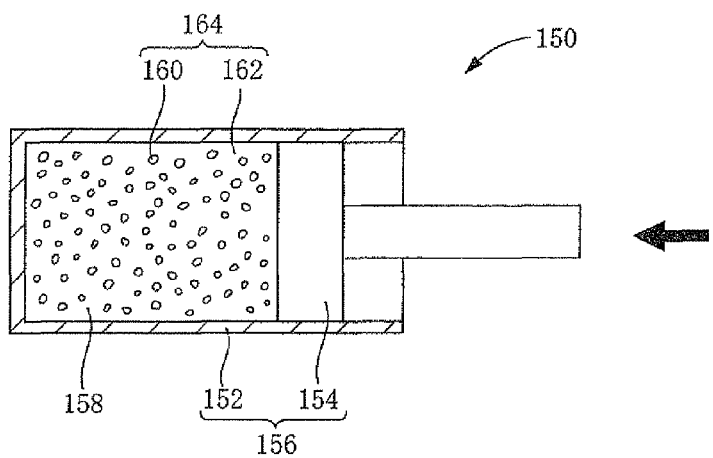
FIG. 4 is a front cross-sectional view of a known colloidal damper with a simple structure.

As described above, the present suspension apparatus is constituted principally by the colloidal damper 10. The function of the colloidal damper 10 will be explained in detail. Before explaining the present colloidal damper 10, the ordinary characteristic of a colloidal damper will be explained in detail with reference to FIG. 5, taking, as an example, a colloidal damper 150 with a simple structure shown in FIG. 4. The colloidal damper 150 includes a cylinder device 156 constituted by a housing 152 and a piston 154 which slides in the housing 152. In the colloidal damper 150, a colloidal solution 164 in which are mixed porous bodies 160 and a working fluid 162 is contained in a chamber 158 defined by the housing 152 and the piston 154.

Figure 5:
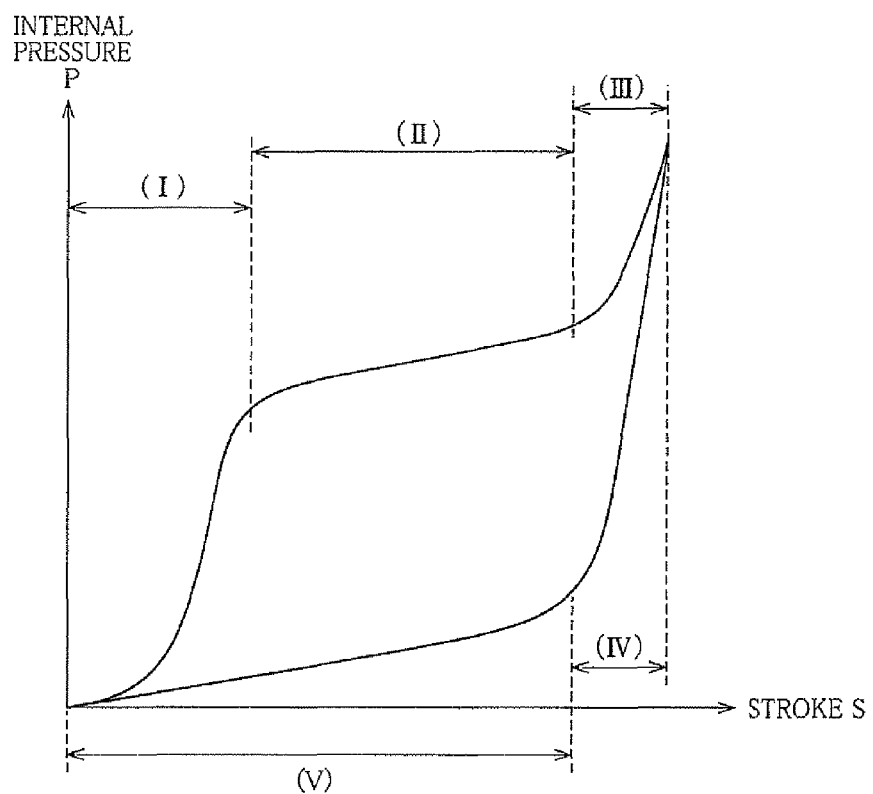
FIG. 5 is a graph showing a relationship between a stroke of a cylinder device and an internal pressure of the cylinder device in the colloidal damper shown in FIG. 4.

FIG. 5 shows a relationship between relative movement amount S of the housing 152 and the piston 154 (stroke of the cylinder device 156) and internal pressure p of the chamber 158. In the colloidal damper 150, when a force to contract the cylinder device 156 is applied from the exterior, the fluid pressure of the working fluid 162 in the chamber 158 rises greatly (i.e., at a steep gradient) as shown in a range (I) in FIG. 5. When the fluid pressure of the working fluid 162 reaches a certain level, the working fluid 162 starts to flow into the pores of the porous bodies 160 against surface tension of the working fluid 162. The working fluid 162 flows into the pores of the porous bodies 160 by an amount corresponding to the magnitude of the applied force as shown in a range (II) in FIG. 5. The inflow of the working fluid 162 into the porous bodies 160 causes a decrease in the volume of the colloidal solution 164, and the cylinder device 156 carries out stroke movement so as to contract. That is, the inflow amount of the working fluid 162 and the volume change of the chamber 158 are equal to each other, and the inflow amount of the working fluid 162 and the stroke of the cylinder device 156 have a linear relationship. Further, where the inflow amount of the working fluid 162 becomes large, the internal pressure of the chamber 158 also becomes large. That is, as shown in the range (II) of FIG. 5, the stroke S of the cylinder device 156 and the internal pressure p of the chamber 158 have a linear relationship. Thereafter, when the working fluid 162 flows into the porous bodies 160 by an amount close to a limit amount (maximum amount) that can flow into the porous bodies 160, the fluid pressure of the working fluid 162 starts to greatly rise as shown in a range (III) in FIG. 5.

Subsequently, when the force that has been applied to the cylinder device 156 is removed, the fluid pressure of the working fluid 162 is lowered greatly (i.e., at a steep gradient) as shown in a range (IV) in FIG. 5. Thereafter, when the fluid pressure of the working fluid 162 is lowered, the working fluid 162 flows out of the pores of the porous bodies 160 as shown in a range (V) in FIG. 5. The outflow of the working fluid 162 from the porous bodies 160 causes an increase in the volume of the colloidal solution 164, and the cylinder device 156 carries out stroke movement so as to extend. As in the process of the inflow of the working fluid 162 described above, in the process of the outflow of the working fluid 162 shown in the range (V) of FIG. 5, the stroke S of the cylinder device 156 and the internal pressure p of the chamber 158 have a linear relationship.

The state between the porous body 160 and the working fluid 162 is explained as follows using a concept of a contact angle therebetween. The contact angle is large when the working fluid 162 flows into the porous body 160 while the contact angle is small when the working fluid 162 flows out of the porous body 160. Accordingly, there is generated a difference between the internal pressure of the chamber 158 at the time of the inflow of the working fluid (i.e., at the time of contraction) and the internal pressure of the chamber 158 at the time of the outflow of the working fluid (i.e., at the time of extension), as shown in FIG. 5. That is, there is generated hysteresis in the change of the internal pressure p of the chamber 158 with respect to the change of the stroke S of the cylinder device 156, as shown in FIG. 5. Owing to this, the colloidal damper 150 is configured to damp the relative movement of the two members that move relative to each other, by dissipating the energy. It is noted that the area of the portion enclosed by the hysteresis in FIG. 5 corresponds to the dissipated energy.

ii) Characteristic of Present Colloidal Damper

Figure 6:
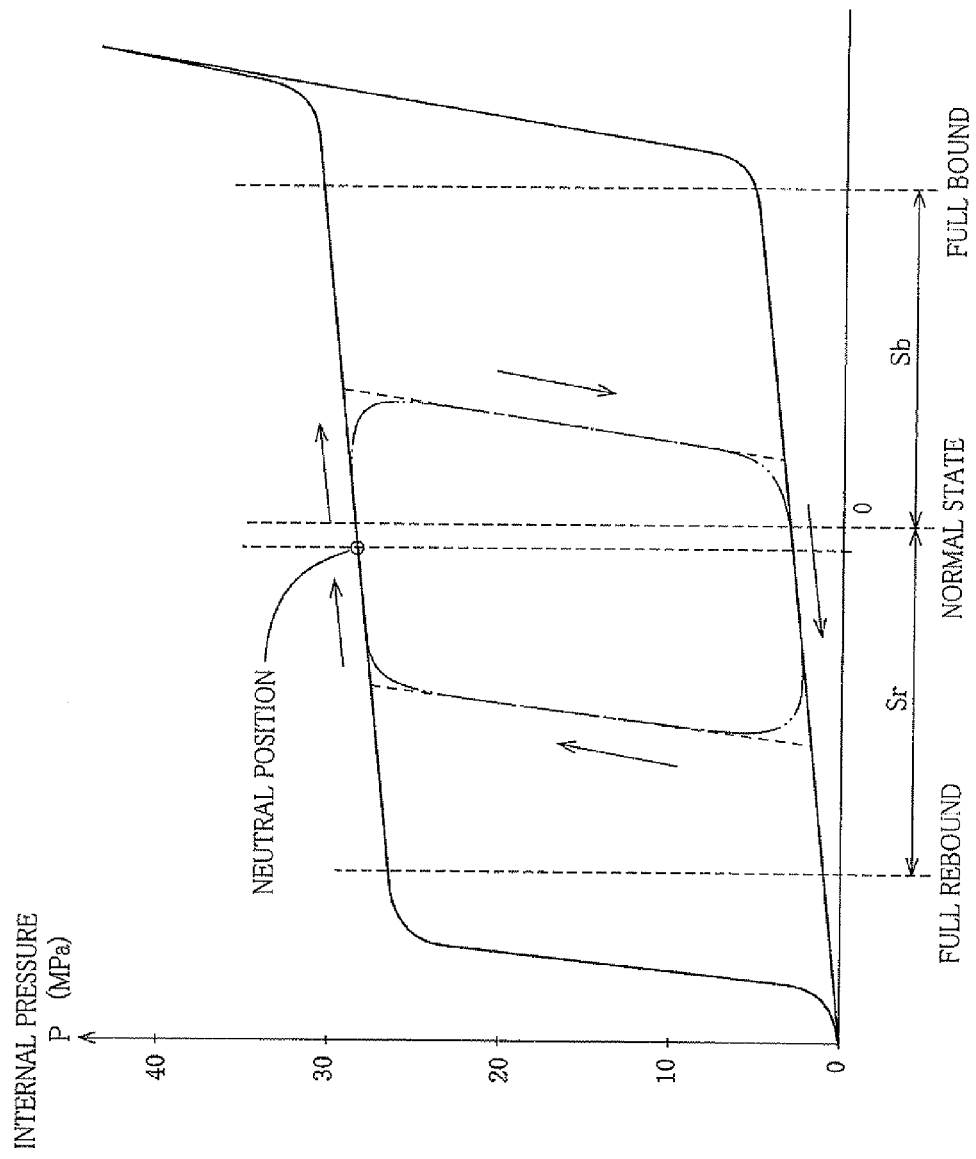
FIG. 6 is a graph showing a relationship between a stroke of a cylinder device and an internal pressure of the cylinder device in the colloidal damper according to the embodiment of the claimable invention.

In the present colloidal damper 10, although the colloidal solution is hermetically contained in the bellows, the force applied to the cylinder device 40 is transmitted to the colloidal-solution sealed bodies 92, 98 via the mineral oil 110 as the outside working fluid. When the first colloidal-solution sealed body 92 receives the force applied thereto, the fluid pressure of the water 88 as the inside working fluid accommodated in the bellows 80 rises. When the fluid pressure of the water 88 reaches a certain level, the water 88 flows into the pores 102 of the hydrophobized porous silica gel particles 100 against the surface tension. In association with the inflow of the water 88, the bellows 80 contracts and the volume of the first colloidal-solution sealed body 92 decreases. On the other hand, when the first colloidal-solution sealed body 92 is released from the force applied thereto, the fluid pressure of the water 88 is lowered and the water 88 flows out of the pores 102 of the hydrophobized porous silica gel particles 88. In association with the outflow of the water 88, the bellows 80 extends and the volume of the first colloidal-solution sealed body 92 increases. The second colloidal-solution sealed body 98 acts like the first colloidal-solution sealed body 92. That is, owing to the increase in the force applied to the second colloidal-solution sealed body 98, the mixed liquid 94 as the inside working fluid flows into the pores 102 of the hydrophobized porous silica gel particles 100 and the volume of the second colloidal-solution sealed body 98 decreases. Further, owing to the decrease in the force applied to the second colloidal-solution sealed body 98, the mixed liquid 94 flows out of the pores 102 of the hydrophobized porous silica gel particles 100 and the volume of the second colloidal-solution sealed body 98 increases. In other words, the present colloidal damper 10 has a characteristic similar to that of the colloidal damper 150 described above. In FIG. 6, there is shown a relationship between the stroke S of the cylinder device 40 and the internal pressure p of the upper chamber 62 of the present colloidal damper 10. The internal pressure p of the upper chamber 62 is the same as the internal pressure of the lower chamber 64 and is hereinafter referred to as the internal pressure of the cylinder device 40 where appropriate.

<Function of Present Colloidal Damper> i) Function as Suspension Spring

As described above, the present colloidal damper 10 is a main constituent element of the suspension apparatus. The present colloidal damper 10 has a function as a suspension spring. In the colloidal damper 10, when a certain magnitude of the force is applied to the cylinder device 40 from the exterior, the internal pressure p of the cylinder device 40 rises to a level corresponding to the magnitude of the force, so that a force to be generated by the cylinder device 40 balances with the force applied from the exterior. Accordingly, the present colloidal damper 10 is configured to bear a shared load (so-called 1W) of the wheel 12 corresponding to itself, by the internal pressure of the cylinder device 40 generated in a state in which the water 88 has flowed, by a certain amount, into the pores 102 of the hydrophobized porous silica gel 100.

As shown in FIG. 6, the present colloidal damper 10 is configured such that the internal pressure p of the cylinder device 40 becomes equal to a level proportional to the inflow amount of the water 88 into the pores 102 of the hydrophobized porous silica gel particles 100, where the cylinder device 40 carries out stroke movement so as to decrease the volume of the upper chamber 62 in which the colloidal-solution sealed bodies 92, 98 are accommodated, in short, where the cylinder device 40 moves so as to contract. Further, the present colloidal damper 10 is configured such that the water 88 does not entirely flow out of the pores 102 of the hydrophobized porous silica gel particles 100 and such that the inflow amount of the water 88 into the pores 102 of the hydrophobized porous silica gel particles 100 does not reach a limit amount that can flow into the pores 102, within a range in which the cylinder device 40 carries out stroke movement. Accordingly, it may be understood that the present colloidal damper 10 generates a force for supporting 1W in an overall stroke range of the cylinder device 40 defined by the rebound stopper and the bound stopper.

It is noted that, in the present colloidal damper 10, the amount (the volume) of the hydrophobized porous silica gel 86 and the amount (the volume) of the inside working fluid 88, 94 accommodated in each of the two colloidal-solution sealed bodies 92, 98 are determined, such that the cylinder device 40 carries out stroke movement within a range in which the internal pressure p of the cylinder device 40 is proportional to the inflow amount of the water 88 into the pores 102 of the hydrophobized porous silica gel particles 100. Where the cylinder device 40 carries out stroke movement by a stroke amount $S_b$ in the bound direction and by a stroke amount $S_r$ in the rebound direction from a neutral position in a normal state (such as a state in which no one rides on the vehicle, no cargo is carried by the vehicle, and the vehicle is at a standstill on a horizontal surface), there is obtained, as follows, a volume change $\Delta V$ which is a difference between a total volume of the upper chamber 62 and the lower chamber 64 of the cylinder device 40 at the time of full bound and a total volume of the upper chamber 62 and the lower chamber 64 at the time of full rebound:

$$\Delta V = A \cdot (S_b + S_r)$$

Here, "A" represents a pressure receiving area on which the pressure in the housing 42 acts on the piston 44 and corresponds to a cross-sectional area of the piston rod 68 in the cylinder device 40.

In the present colloidal damper 10, it is necessary that the working fluid whose amount is equal to the volume change $\Delta V$ can flow into the hydrophobized porous silica gel 86. That is, where a ratio of the limit amount by which the working fluid can flow into the hydrophobized porous silica gel 86 with respect to the volume of the hydrophobized porous silica gel 86 is defined as "η", a minimum required amount (which is a volume) $V_{Smin}$ of the hydrophobized porous silica gel 86 is determined as follows:

$$V_{Smin} = \Delta V/\eta$$

In some cases, the hydrophobized porous silica gel 86 is not entirely hydrophobized in the hydrophobization treatment, and there may remain silica gel having water absorbency. Where a ratio of an amount of the hydrophobized silica gel except for an amount of the silica gel which was not hydrophobized, with respect to an entire amount of the silica gel subjected to the hydrophobization treatment is determined as a hydrophobization ratio "β" for dealing with a variation in the hydrophobization degree, for instance, an actual amount (which is a volume) $V_S$ of the hydrophobized porous silica gel 86 is obtained as follows and accordingly the actual amount $V_S$ is made larger than the minimum required amount $V_{Smin}$:

$$V_S = V_{Smin}/\beta$$

Further, because the present colloidal damper 10 includes the two colloidal-solution sealed bodies 92, 98, a sum of the amount $V_{S1}$ of the hydrophobized porous silica gel 86 in the first colloidal-solution sealed body 92 and the amount $V_{S2}$ of the hydrophobized porous silica gel 86 in the second colloidal-solution sealed body 98 is made equal to the above-indicated amount $V_S$.

The amount of the hydrophobized porous silica gel 86 is $V_S$. On the other hand, an amount $V_F$ of the working fluid should be not smaller than $\Delta V$. Accordingly, in the present colloidal damper 10, the amount $V_F$ is made equal to the amount $V_S$. That is, in the present colloidal damper 10, the amount $V_{F1}$ of the water 88 as the inside working fluid in the first colloidal-solution sealed body 92 is made equal to the amount $V_{S1}$ of the hydrophobized porous silica gel 86 in the first colloidal-solution sealed body 92 while the amount $V_{F2}$ of the mixed liquid 94 as the inside working fluid in the second colloidal-solution sealed body 98 is made equal to the amount $V_{S2}$ of the hydrophobized porous silica gel 86 in the second colloidal-solution sealed body 98.

ii) Function as Shock Absorber

In the present colloidal damper 10, the internal pressure change in one cycle motion from the neutral position is represented by the long dashed double-short dashed line in FIG. 6 in terms of the relationship with respect to the stroke S of the cylinder device 40. As in the ordinary colloidal damper 150 explained above, in the present colloidal damper 10, there is generated a difference between the internal pressure of the cylinder device 40 when the working fluid flows into the pores of the porous bodies (i.e., when the cylinder device 40 contracts) and the internal pressure of the cylinder device 40 when the working fluid flows out of the pores of the porous bodies (i.e., when the cylinder device 40 extends). Accordingly, there is generated hysteresis in the change of the internal pressure p of the cylinder device 40 with respect to the change of the stroke S of the cylinder device 40, as shown in FIG. 6. The area of the portion enclosed by the long dashed double-short dashed line in FIG. 6 corresponds to an energy dissipated in the one cycle motion. That is, the present colloidal damper 10 is configured to damp the relative movement of the vehicle body and the wheel, so as to function as a shock absorber (i.e., damper).

<Characteristic of Present Colloidal Damper>

As described above, the present colloidal damper 10 has not only the function as the shock absorber, but also the function as the suspension spring. Accordingly, it is not necessary to provide a suspension spring, so that the suspension apparatus for the vehicle equipped with the present colloidal damper 10 is simple in construction.

The present colloidal damper 10 is configured such that the colloidal solution composed of the porous bodies and the working fluid is hermetically contained in the hermetically sealed container and such that the working fluid does not flow out of the hermetically sealed container. Accordingly, in the present colloidal damper 10, the hydrophobized porous silica gel particles 100 having comparatively high hardness do not rub against the housing 42 and the piston 44, thereby preventing wear of the inside of the cylinder device 40. For instance, there exists a colloidal damper in which the porous bodies are separated or isolated, using a filter or a container, from a portion of the housing on which the piston slides. In such a colloidal damper, however, the porous bodies which had been crushed by a stress or the like and become smaller may clog the filter or the container or may pass therethrough. In contrast, in the present colloidal damper 10, the colloidal solution is hermetically contained in the hermetically sealed container, whereby the porous bodies do not flow out of the hermetically sealed container even if the porous bodies are crushed and become smaller. Accordingly, the present colloidal damper 10 is excellent in durability.

The present colloidal damper 10 has the two colloidal-solution sealed bodies 92, 98 which are fixed to the housing 42 and are connected to the mount portion 32 as a part of the vehicle body. In short, the colloidal-solution sealed bodies 92, 98 are provided on the vehicle body side. Accordingly, as compared with an arrangement in which the colloidal-solution sealed bodies are provided on the wheel side, it is possible to restrain an unsprung vibration having a high frequency from being inputted to the colloidal-solution sealed bodies, whereby it is possible to restrain the insides of the bellows 80, 82 from being worn due to the hydrophobized porous silica gel particles 100 moved in the bellows 80, 82.

Further, the weight of the housing 42 which accommodates the colloidal-solution sealed bodies 92, 98 and the mineral oil 110 as the outside working fluid is relatively large. However, because the housing 42 is connected to the vehicle body, the unsprung weight (i.e., a weight of the wheel side to which the piston 44 is connected) is made small, so that the vehicle ride comfort is prevented from being deteriorated.

Further, in the present colloidal damper 10, the inside working fluid which flows into and out of the pores 102 of the hydrophobized porous silica gel particles 100 is different from the outside working fluid which is contained in the chambers 62, 64 for transmitting, to the colloidal-solution sealed bodies 92, 98, the force applied to the cylinder device 40. Thus, the inside working fluid and the outside working fluid have mutually different properties. More specifically, the mineral oil 110 as the outside working fluid and the water 88 and the mixed liquid 94 each as the inside working fluid are different in dynamic viscosity, namely, the dynamic viscosity of the outside working fluid is higher than that of the inside working fluid. Accordingly, the mineral oil 110 as the outside working fluid is capable of efficiently transmitting the force applied to the cylinder device 40, to the colloidal-solution sealed bodies 92, 98. In the present colloidal damper 10, it is necessary to keep the internal pressure of the cylinder device 40 at a high level for supporting 1W. Since the mineral oil 110 as the outside working fluid has high viscosity in the present colloidal damper 10, the sealing tightness of the seals 104, 106, 108 provided in the housing 40 is ensured.

Further, the mineral oil 110 as the outside working fluid and the water 88 as the inside working fluid are mutually different in heat conductivity; namely, the heat conductivity of the outside working fluid is lower than that of the inside working fluid. In the present colloidal damper 10, the colloidal-solution sealed bodies 92, 98 are covered with the mineral oil 110. In other words, in the present colloidal damper 10, there may be a risk that the water 88 as the inside working fluid solidifies or freezes when the outside air temperature becomes low. However, the mineral oil 110 whose heat conductivity is low restrains transfer of the temperature to the water 88 and makes it possible to restrain a temperature decrease of the water 88.

Moreover, the mineral oil 110 as the outside working fluid and the water 88 as the inside working fluid are mutually different in coagulation temperature. (The coagulation temperature may be referred to as solidification temperature or freezing temperature.) That is, the coagulation temperature of the outside working fluid is lower than that of the inside working fluid. For instance, there may be a risk that the force to be transmitted to the colloidal-solution sealed bodies 92, 98 varies with respect to the force applied to the cylinder device 40 when the outside working fluid starts to coagulate. In the present colloidal damper 10, however, the mineral oil 110 which is unlikely to coagulate makes it possible to transmit, with high reliability, the force applied to the cylinder device 40, to the colloidal-solution sealed bodies 92, 98.

In addition, the present colloidal damper 10 has the two colloidal-solution sealed bodies 92, 98, and the first colloidal solution 90 and the second colloidal solution 96 respectively accommodated in the two colloidal-solution sealed bodies 92, 98 are mutually different in composition. More specifically, the inside working fluid of the first colloidal solution 90 is the water 88 while the inside working fluid of the second colloidal solution 96 is the mixed liquid 94 composed of water and the antifreeze agent. Thus, the inside working fluid of the first colloidal solution 90 and the inside working fluid of the second colloidal solution 96 are mutually different in coagulation temperature. Accordingly, in the present colloidal damper 10, even if the water 88 which is the inside working fluid of the first colloidal solution 90 coagulates or freezes, the mixed liquid 94 which is the inside working fluid of the second colloidal solution 96 does not coagulate. Therefore, the present colloidal damper 10 is prevented from falling into an undesirable situation in which the colloidal damper 10 completely fails to operate.

Modified Embodiments

The colloidal damper 10 in the illustrated embodiment has the two colloidal-solution sealed bodies 92, 98, and the inside working fluid of the first colloidal solution 90 and the inside working fluid of the second colloidal solution 96 respectively accommodated in the two colloidal-solution sealed bodies 92, 98 are mutually different. For making the two colloidal solutions mutually different in composition, it is not essential that those inside working fluids be mutually different fluids. For instance, the porous bodies in the respective two colloidal solutions may be mutually different. The amounts of the porous bodies in the respective two colloidal solutions may be made different from each other. The degree of the lyophobization treatment of the porous bodies (such as the average pore diameter or the overall length of the pores) in the first colloidal solution may differ from that in the second colloidal solution. In this respect, FIG. 7(a) shows a relationship between a stroke of a cylinder device and an internal pressure of the cylinder device in a colloidal damper in which the degree of lyophobization treatment of the porous bodies in the first colloidal solution is made different from that of the porous bodies in the second colloidal solution. In this colloidal damper, the relationship between the stroke of the cylinder device and the internal pressure of the cylinder device has a non-linear characteristic. FIG. 7(b) shows a relationship between a stroke of a cylinder device and an internal pressure of the cylinder device for each of the first colloidal solution and the second colloidal solution which are different in degree of the lyophobization treatment of the porous bodies. By adding the characteristics of the two colloidal solutions together, it is possible to adjust a spring constant in an instance in which the colloidal damper functions as a spring, at a suitable value, in the stroke range of the cylinder device. Thus, in the colloidal damper having the two colloidal-solution sealed bodies, the two colloidal solutions are made mutually different in composition and the characteristics of the respective two colloidal solutions are combined, whereby it is possible to attain the colloidal damper having various characteristics and to make the characteristic of the colloidal damper appropriate.

Figure 8:
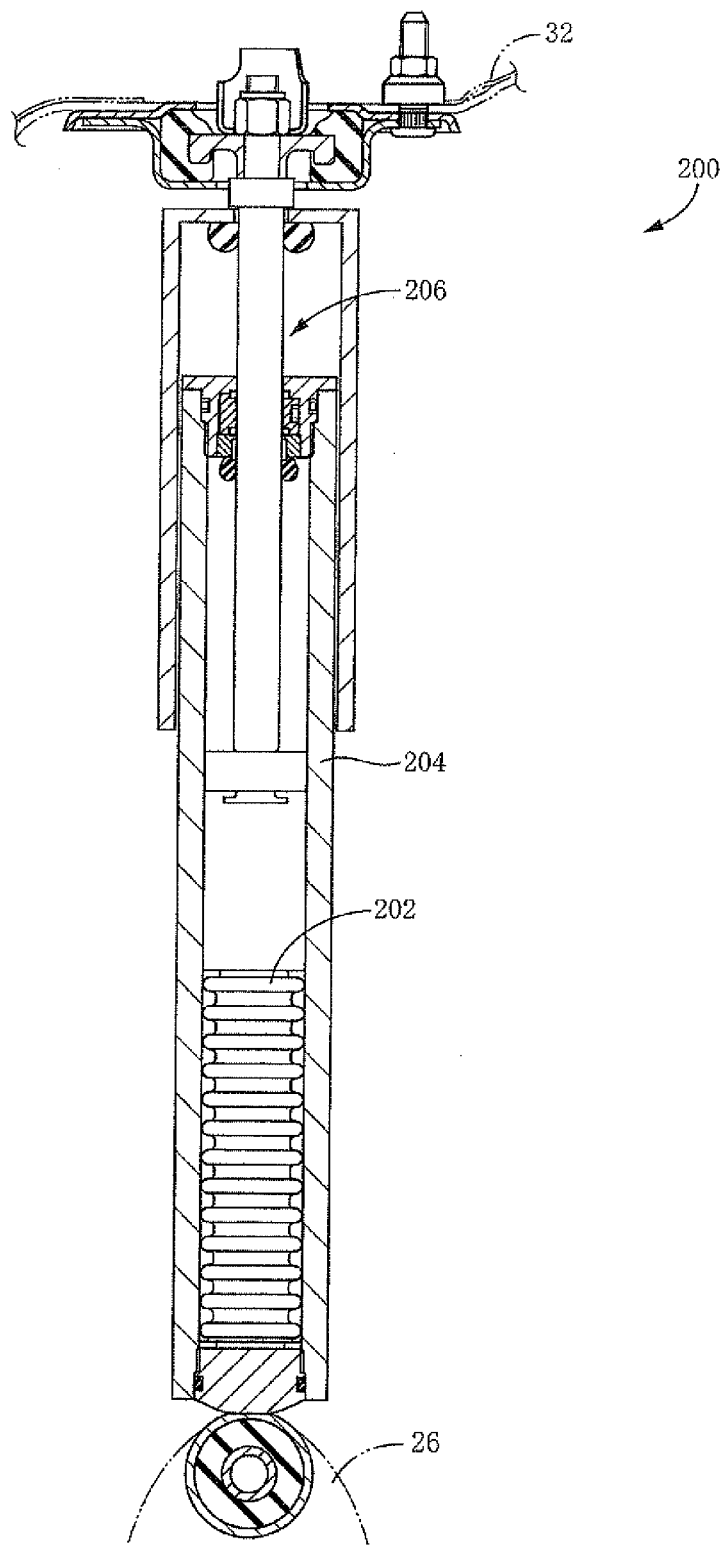
FIG. 8 is a front cross-sectional view of a colloidal damper according to a first modified embodiment of the claimable invention.

FIG. 8 is a front cross-sectional view of a colloidal damper 200 according to a first modified embodiment. The colloidal damper 200 of the first modified embodiment has a more simplified structure than the colloidal damper 10 of the illustrated embodiment. While the colloidal damper 10 has the two colloidal-solution sealed bodies, the colloidal damper 200 has one colloidal-solution sealed body 202. In the colloidal damper 10 of the illustrated embodiment, the housing 42 is connected to the vehicle body while the piston 44 is connected to the wheel holding member. In the colloidal damper 200 of the first modified embodiment, a housing 204 is connected to the wheel holding member while a piston 206 is connected to the vehicle body.

Figure 9:
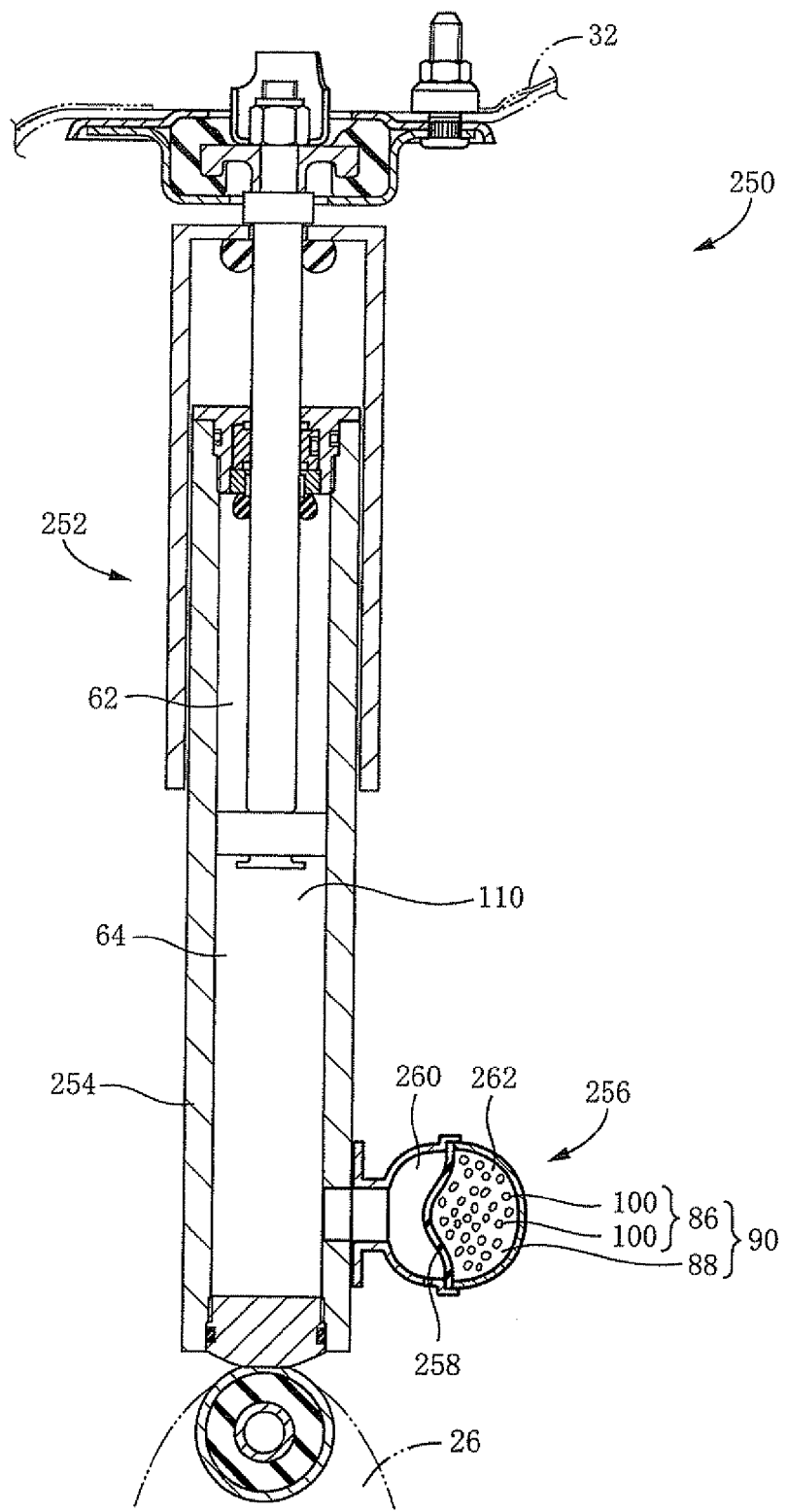
FIG. 9 is a front cross-sectional view of a colloidal damper according to a second modified embodiment of the claimable invention.

FIG. 9 is a front cross-sectional view of a colloidal damper 250 according to a second modified embodiment. A cylinder device 252 of the colloidal damper 250 according to the second modified embodiment has a spherical casing 256 which is connected to a lower part of the housing 254, so that the casing 256 constitutes a part of the housing 254. The casing 256 has, in its inside, a diaphragm 258 formed of a rubber. The diaphragm 258 partitions the inside of the casing 256 into two volume variable chambers, i.e., a left volume variable chamber 260 and a right volume variable chamber 262. The left volume variable chamber 260 is held in communication with the lower chamber 62 of the housing 254 and contains the mineral oil 110 as a second working fluid. On the other hand, the right volume variable chamber 262 is formed as a hermetically sealed space and contains the colloidal solution 90 composed of the hydrophobized porous silica gel 86 and the water 88 as a first working fluid. In other words, in the colloidal damper 250 of the second modified embodiment, the housing 254 and the casing 256 constitute a chamber for accommodating the colloidal solution. Further, in the colloidal damper 250, the diaphragm 258 constitutes, together with the casing 256 as the part of the housing 254, a hermetically sealed space in which the colloidal solution 90 is hermetically contained. In the colloidal damper 10 of the illustrated embodiment, the colloidal solution is hermetically sealed only by the hermetically sealed container. In the colloidal damper 250 of the second modified embodiment, the colloidal solution is hermetically sealed by the diaphragm 258 and the part of the housing 254 (as the hermetically sealed container).

REFERENCE SIGNS LIST

10: colloidal damper 12: wheel 26: second lower arm 30: axle carrier (wheel holding member) 32: mount portion (a part of a vehicle body) 40: cylinder device 42: housing 44: piston 60: piston body 62: upper chamber (chamber) 64:

lower chamber 68: piston rod 80, 82: bellows (hermetically sealed container) 86: hydrophobized porous silica gel 88: water (inside working fluid) 90: first colloidal solution 92: first colloidal-solution sealed body 94: mixed liquid 96: second colloidal solution 98: second colloidal-solution sealed body 100: hydrophobized porous silica gel particles (porous bodies) 102: pores 110: mineral oil (outside working fluid) 112: communication passage 114, 116: high-pressure seal 200: colloidal damper 202: colloidal-solution sealed body 204: housing 206: piston 250: colloidal damper 252: cylinder device 254: housing (hermetically sealed container) 256: casing 258: diaphragm (hermetically sealed container)

The invention claimed is:

1. A suspension apparatus for a vehicle to suspend a body of the vehicle, comprising:
    a damper disposed between the body of the vehicle and a wheel holding member which rotatably holds a wheel, wherein the damper includes:
    a cylinder device including a housing connected to one of the body of the vehicle and the wheel holding member and a piston connected to the other of the body of the vehicle and the wheel holding member and configured to be slidable in the housing, the housing and the piston defining a chamber whose volume is decreased when the body of the vehicle and the wheel holding member approach each other,
    a colloidal-solution sealed body which is accommodated in the chamber and which includes: (A) a colloidal solution in which are mixed a first working fluid and porous bodies each having a multiplicity of pores; and (B) a hermetically sealed container which has flexibility and which hermetically seals the colloidal solution contained therein, the colloidal-solution sealed body being configured such that a volume of the colloidal-solution sealed body decreases by an inflow of the first working fluid into the pores of each of the porous bodies where a pressure applied to the colloidal-solution sealed body increases and such that the volume of the colloidal-solution sealed body increases by an outflow of the first working fluid from the pores of each of the porous bodies where the pressure applied to the colloidal-solution sealed body decreases, and
    a second working fluid contained in the chamber together with the colloidal-solution sealed body, wherein
    in a state in which the body of the vehicle is stationary with respect to the wheel holding member and the damper is at rest, the damper supports the body of the vehicle by a pressure in the chamber in a state in which the first working fluid has flowed into the porous bodies,
    the damper is configured to damp the relative movement of the body of the vehicle and the wheel holding member by the inflow and the outflow of the first working fluid into and out of the pores of each of the porous bodies upon the relative movement of the body of the vehicle and the wheel holding member,
    where the colloidal-solution sealed body is a first colloidal-solution sealed body, the colloidal damper comprises another colloidal-solution sealed body as a second colloidal-solution sealed body, the first colloidal-solution sealed body and the second colloidal-solution sealed body being accommodated in the chamber, and
    where the colloidal solution of the first colloidal-solution sealed body is a first colloidal solution, the second colloidal-solution sealed body includes a second colloidal solution different from the first colloidal solution in composition.

2. The suspension apparatus according to claim 1, wherein the first working fluid and the second working fluid are mutually different in property.

3. The suspension apparatus according to claim 2, wherein the first working fluid is water and the second working fluid is oil.

4. The suspension apparatus according to claim 1, wherein the first working fluid and the second working fluid are mutually different in viscosity.

5. The suspension apparatus according to claim 4, wherein the second working fluid has a viscosity higher than that of the first working fluid.

6. The suspension apparatus according to claim 1, wherein the first working fluid and the second working fluid are mutually different in heat conduction property.

7. The suspension apparatus according to claim 6, wherein the second working fluid has heat conductivity lower than that of the first working fluid.

8. The suspension apparatus according to claim 1, wherein the first working fluid and the second working fluid are mutually different in coagulation temperature.

9. The suspension apparatus according to claim 8, wherein the second working fluid has a coagulation temperature lower than that of the first working fluid.

10. The suspension apparatus according to claim 1,
    wherein the cylinder device is configured such that an inside of the housing is partitioned, by the piston, into two chambers, one of which is the chamber, and
    wherein the one of the two chambers accommodates the colloidal-solution sealed body.

11. The suspension apparatus according to claim 10, wherein the piston includes:
    a piston body which partitions the inside of the housing into the two chambers such that the piston body is interposed there between; and
    a piston rod which is connected, at one end portion thereof, to the piston body and which is connected, at the other end portion thereof that extends from the housing, to the other of the body of the vehicle and the wheel holding member which move relative to each other, and
    wherein the piston rod extends from the housing such that the piston rod penetrates an other of the two chambers in which the colloidal-solution sealed body is not accommodated, so as to be connected to the other of the body of the vehicle and the wheel holding member.

12. The suspension apparatus according to claim 1, wherein the colloidal-solution sealed body is fixed to one end of the chamber remote from the piston.

13. The suspension apparatus according to claim 1,
    wherein the colloidal-solution sealed body is fixed to one end of the chamber remote from the piston, and
    wherein the housing is connected to the body of the vehicle and the piston is connected to the wheel holding member.

14. The suspension apparatus according to claim 1, wherein the damper is configured to bear all of a shared load of a wheel that corresponds to the damper by the pressure in the chamber in the state in which the first working fluid has flowed into the porous bodies.

15. The suspension apparatus according to claim 1, wherein the damper is configured such that the pressure in the chamber is proportional to an amount of the working fluid that has flowed into the porous bodies, in a range in which the vehicle body and the wheel holding member move relative to each other.

* * * * *